United States Patent
Serkh et al.

(10) Patent No.: US 8,419,574 B2
(45) Date of Patent: Apr. 16, 2013

(54) ISOLATOR

(75) Inventors: Alexander Serkh, Troy, MI (US); Peter Ward, Farmington Hills, MI (US); Imtiaz Ali, Lathrup Village, MI (US); Dean Schneider, Washington, MI (US)

(73) Assignee: The Gates Corporation, Denver, CO (US)

( * ) Notice: Subject to any disclaimer, the term of this patent is extended or adjusted under 35 U.S.C. 154(b) by 643 days.

(21) Appl. No.: 12/798,512

(22) Filed: Apr. 6, 2010

(65) Prior Publication Data
US 2011/0245000 A1 Oct. 6, 2011

(51) Int. Cl.
*F16H 55/36* (2006.01)

(52) U.S. Cl.
USPC .......................................................... 474/94

(58) Field of Classification Search .............. 474/69, 474/70, 74, 94; 192/41 S, 81 C
See application file for complete search history.

(56) References Cited

U.S. PATENT DOCUMENTS

| | | | |
|---|---|---|---|
| 4,460,076 A | 7/1984 | Yamada | 192/35 |
| 4,486,183 A | 12/1984 | Posiviata | |
| 5,139,463 A | 8/1992 | Bytek et al. | 474/69 |
| 5,156,573 A | 10/1992 | Bytzek et al. | 474/74 |
| 6,083,130 A | 7/2000 | Mevissen et al. | 474/70 |
| 6,875,113 B2* | 4/2005 | Nichols | 464/90 |
| 7,153,227 B2 | 12/2006 | Dell et al. | 474/70 |
| 7,207,910 B2 | 4/2007 | Dell et al. | 474/74 |
| 7,618,337 B2* | 11/2009 | Jansen et al. | 474/74 |
| 7,878,315 B2* | 2/2011 | Saito et al. | 192/41 S |
| 8,021,253 B2* | 9/2011 | Dell et al. | 474/74 |
| 8,202,183 B2* | 6/2012 | Riu | 474/94 |
| 2004/0014540 A1* | 1/2004 | Dell et al. | 474/70 |
| 2007/0254756 A1 | 11/2007 | Kawamoto | |
| 2008/0207364 A1* | 8/2008 | Schebitz et al. | 474/94 |
| 2008/0312014 A1* | 12/2008 | Stief et al. | 474/94 |
| 2010/0029422 A1* | 2/2010 | Riu | 474/94 |
| 2010/0255943 A1* | 10/2010 | Cali et al. | 474/94 |
| 2011/0065537 A1* | 3/2011 | Serkh et al. | 474/94 |
| 2011/0224038 A1* | 9/2011 | Aantchak et al. | 474/94 |

FOREIGN PATENT DOCUMENTS

| | | |
|---|---|---|
| WO | 2005057037 A1 | 6/2005 |
| WO | 2009099504 A2 | 8/2009 |

\* cited by examiner

*Primary Examiner* — William E Dondero
*Assistant Examiner* — Robert T Reese
(74) *Attorney, Agent, or Firm* — J. A. Thurnau, Esq.; P. N. Dunlap, Esq.

(57) ABSTRACT

An isolator comprising a shaft (10), a pulley (20) journalled to the shaft on a first bushing (40) and a second bushing (50), the shaft comprising a shaft stop (12) disposed on a shaft radially outer surface (14), the pulley and the shaft rotationally moveable relative to each other, the pulley comprising an inner hub (23), the inner hub having a pulley stop (24) disposed to cooperatively engage the shaft stop, a torsion spring (30) engaged with the shaft and the pulley, the torsion spring exerting a contractive force parallel to an axis of rotation (A-A) in order to retain the pulley on the shaft, a cover member (60) fixed to the shaft, the pulley urged into engagement with the cover member by the torsion spring axial contractive force, and a rubber member (80) disposed on the shaft stop for engaging the pulley stop.

4 Claims, 5 Drawing Sheets

ISOLATOR

FIELD OF THE INVENTION

The invention relates to an isolator, and more particularly to an alternator isolator having a torsion spring exerting an axial contractive force to retain the pulley on the shaft.

BACKGROUND OF THE INVENTION

Vehicle internal combustion engines typically comprise a front end belt driven accessory drive. The accessories can include power steering, an alternator, water pump and so on. The accessory drive can also be referred to as a serpentine drive since the belt often traces a circuitous path about the front plane of an engine.

A typical serpentine drive system includes a driving pulley on the crankshaft of an internal combustion engine of the vehicle, a series of driven pulleys for the accessories and a poly-V belt trained about the driving and driven pulleys. An advantage of the serpentine drive is that by providing an automatic belt tensioner on the belt the accessories can be fixedly mounted.

Particularly where the engine is of the four-cylinder type, the driving pulley establishes a highly dynamic loading on the belt. This high dynamic loading is due to the variable torque output characteristics of the crankshaft. A belt tensioner cannot accommodate all of the variable torque characteristics. The result can be noise and decreased belt life due to instantaneous belt slippage.

Representative of the art is U.S. Pat. No. 5,139,463 which discloses a serpentine belt drive system for an automotive vehicle in which the sequence of driven assemblies includes an alternator assembly comprising a housing and an armature assembly mounted in the housing for rotation about an armature axis. A hub structure is carried by the armature assembly outwardly of the housing for rotation therewith about the armature axis. A coil spring is disposed in operative relation between the alternator pulley and the hub structure for transmitting the driven rotational movements of the alternator pulley by the serpentine belt to the hub structure such that the armature assembly is rotated in the same direction as the alternator pulley while being capable of instantaneous relative resilient rotational movements in opposite directions with respect to the alternator pulley during the driven rotational movement thereof.

What is needed is an isolator having a torsion spring exerting an axial contractive force to retain the pulley on the shaft. The present invention meets this need.

SUMMARY OF THE INVENTION

The primary aspect of the invention is an isolator having a torsion spring exerting an axial contractive force to retain the pulley on the shaft.

Other aspects of the invention will be pointed out or made obvious by the following description of the invention and the accompanying drawings.

The invention comprises an isolator comprising a shaft, a pulley journalled to the shaft on a first bushing and a second bushing, the shaft comprising a shaft stop disposed on a shaft radially outer surface, the pulley and the shaft rotationally moveable relative to each other, the pulley comprising an inner hub, the inner hub having a pulley stop disposed to cooperatively engage the shaft stop, a torsion spring engaged with the shaft and the pulley, the torsion spring exerting a contractive force parallel to an axis of rotation in order to retain the pulley on the shaft, a cover member fixed to the shaft, the pulley urged into engagement with the cover member by the torsion spring axial contractive force, and a rubber member disposed on the shaft stop for engaging the pulley stop.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
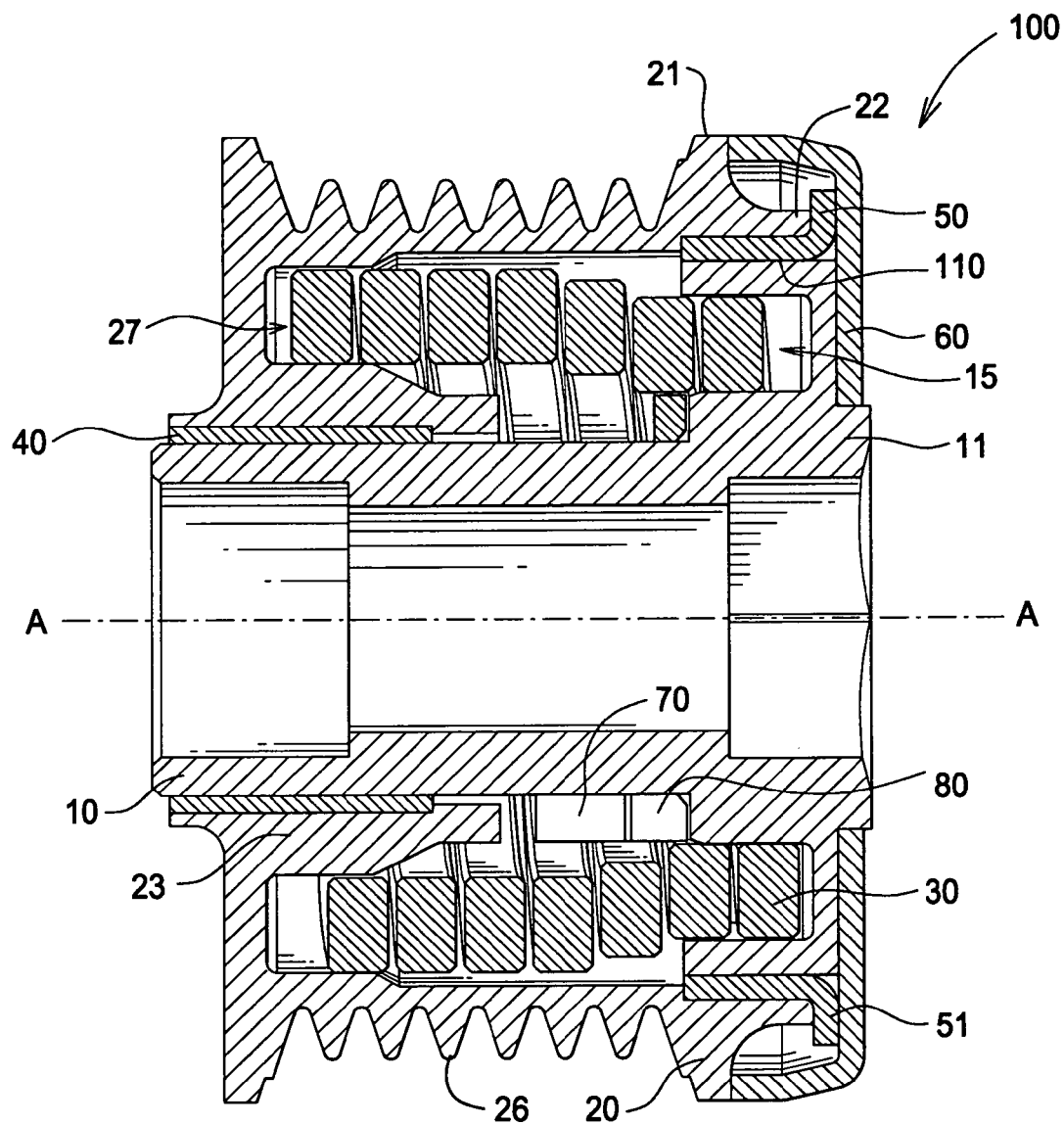
FIG. 1 is a cross sectional view of the inventive isolator.

FIG. 1 is a cross sectional view of the inventive isolator. Isolator 100 comprises a shaft 10 and pulley 20. Pulley 20 is journalled to shaft 10 on bushing 40 and bushing 50. Pulley 20 is connected to shaft 10 by a torsion spring 30.

Torsion spring 30 is an extension type spring with a minimum coil spacing in the no load state. In the no load state spacing between each coil can be anywhere between 0 mm (in contact) up to approximately 0.5 mm. During assembly one end of the torsion spring is pressed into a receiving portion 27 of pulley 20 and the other end is pressed into a receiving portion 15 of shaft 10. Once the torsion spring is installed, the shaft and pulley are pulled apart by approximately 2 mm to 3 mm, whereby the torsion spring is elongated to a desired axial length in order to achieve the intended axial contractive force of approximately 20N to 50 N. The contractive torsion spring rate is in the range of approximately 5N/mm to 20 N/mm. The axial contractive spring force operates parallel to and along the axis or rotation A-A. The pulley is held in rotatable engagement to the shaft by the contractive force exerted by the torsion spring.

Cover 60 is pressed onto the end 11 of shaft 10 and secured by swaging or other known methods. Cover 60 will interface with the flange 51 of the bushing 50. Flange 51 is loaded by the contractive force of torsion spring 30 to bear against cover 60. Flange 22 slidingly bears upon busing flange 51. Bushing 50 may either be fixed with respect to either pulley 20 or shaft 10.

Radially extending flange 21 and axially extending flange 22 of pulley 20 form a labyrinth seal with cover 60 which protects the internal components of the isolator from contamination.

Figure 2:
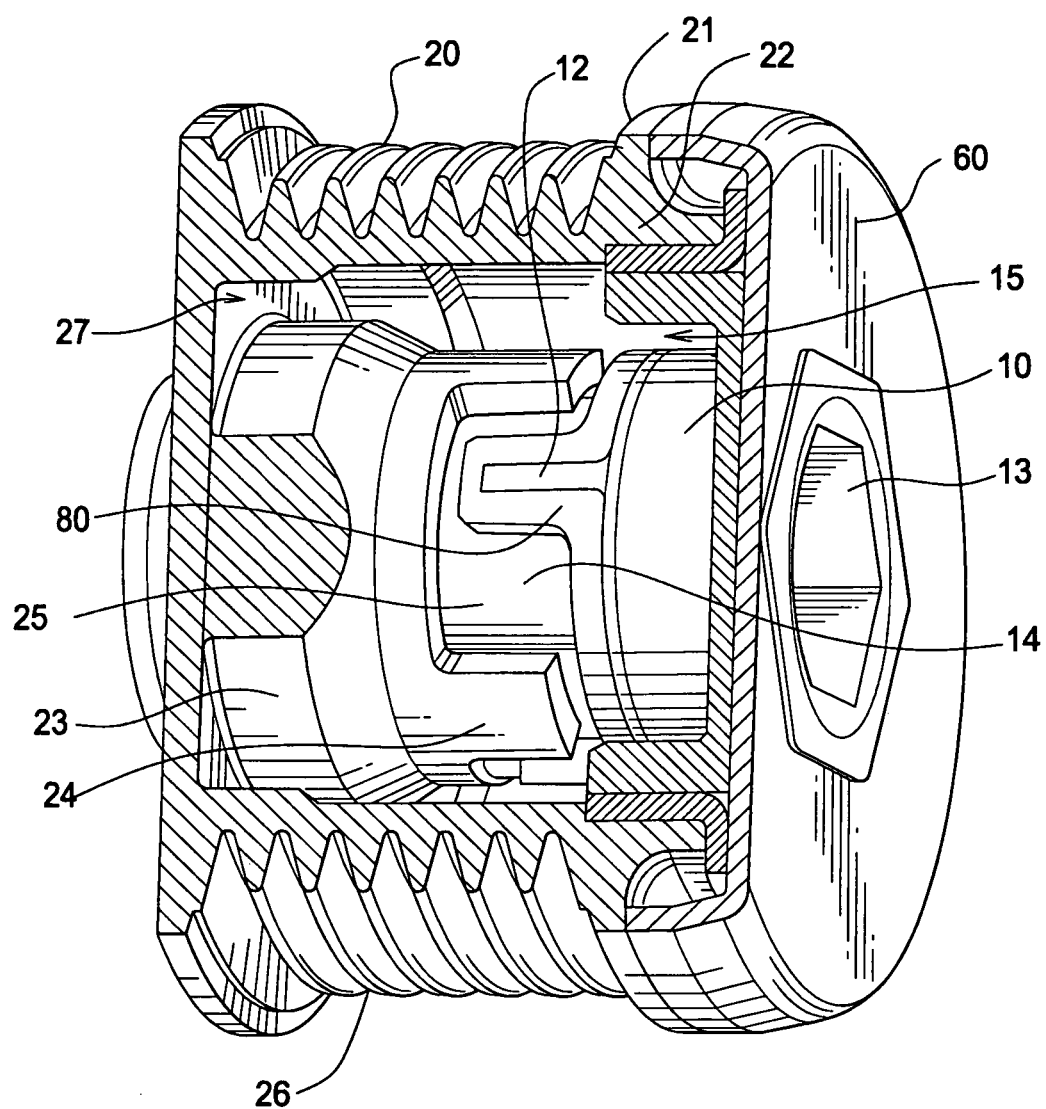
FIG. 2 is a perspective view of the inventive isolator.

FIG. 2 is a perspective view of the inventive isolator. Three stops 24 extend axially parallel to axis A-A from hub 23 of pulley 20. Three stops 12 are also formed on the radially outer surface 14 of shaft 10. A rubber member 80 is placed between pulley stops 24 and shaft stops 12 to dampen an impact pulse and thereby reduce operational noise and vibration.

A gap 25 between pulley stops 24 cooperatively receives stop 12, which gap allows relative rotational movement of pulley 20 compared to shaft 10 such that the isolator torsion spring can wind or unwind depending on whether the isolator is the driver or driven component.

Portion 13 is for receiving a tool, such as a wrench or socket (not shown).

Figure 3:
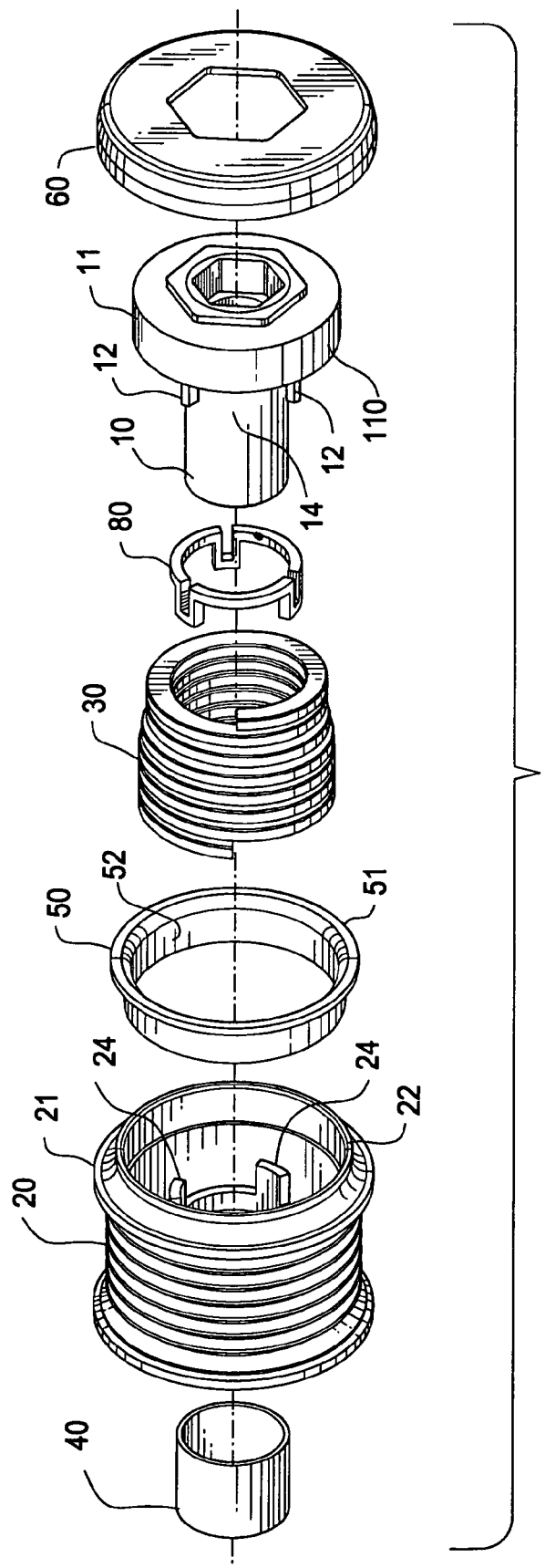
FIG. 3 is an exploded view of the inventive isolator.

FIG. 3 is an exploded view of the inventive isolator. Rubber member 80 is a single piece which engages each of the three shaft stops 12. Member 80 is press fit onto shaft 10 over stops 12. Pulley 20 comprises a multi-ribbed surface 26 for engaging a belt (not shown). Pulley stops 24 are disposed on hub 23.

Figure 4:
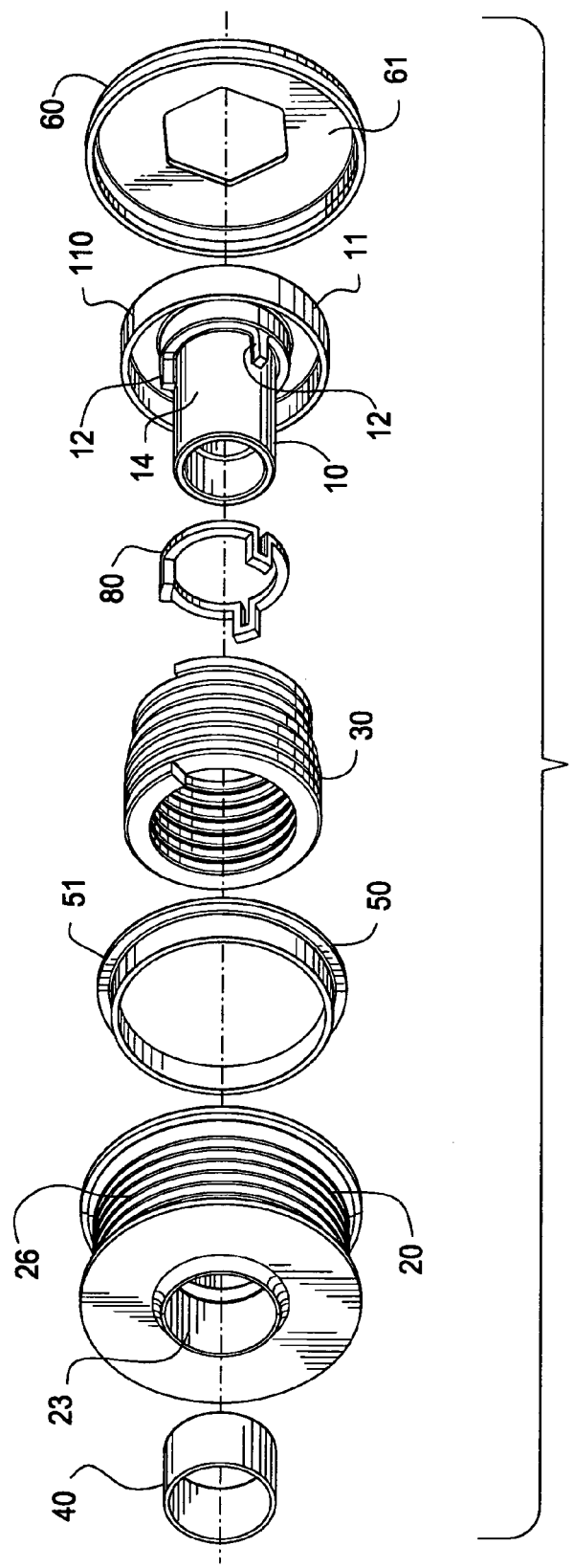
FIG. 4 is an exploded view of the inventive isolator.

FIG. 4 is an exploded view of the inventive isolator. Bushing 40 has a sliding engagement between shaft 10 and hub 23. Bushing 50 has a press fit with pulley 20. Bushing surface 52 has a sliding engagement with surface 110 of end 11. Bushing surface 51 further has a sliding engagement with cover surface 61. Surface 51 is pressed into engagement by the contractive force of torsion spring 30.

Hub 23 is disposed radially inward of the pulley outer multi-ribbed surface 26.

Figure 5:
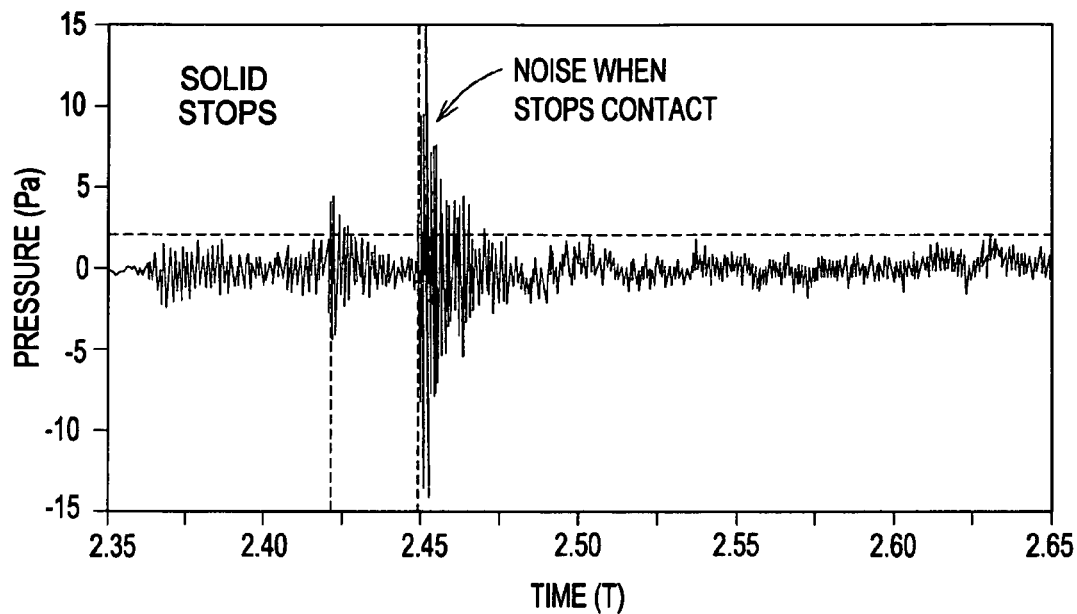
FIG. 5 is a graph of noise produced by metal to metal contact.

FIG. 5 is a graph of noise produced by metal to metal contact. The noise is typically generated when the metallic stops come together during a load reversal. During operation the isolator will be subject to load reversals, such as during deceleration. However, the inertia of the alternator armature will cause the alternator shaft to overrun the belt, causing the shaft stops to impact the pulley stops. The converse is also true, namely, in driving mode the pulley will rotate forward until the pulley stops engage the shaft stops, at which point torque will flow from the pulley to the shaft to drive the alternator.

Figure 6:
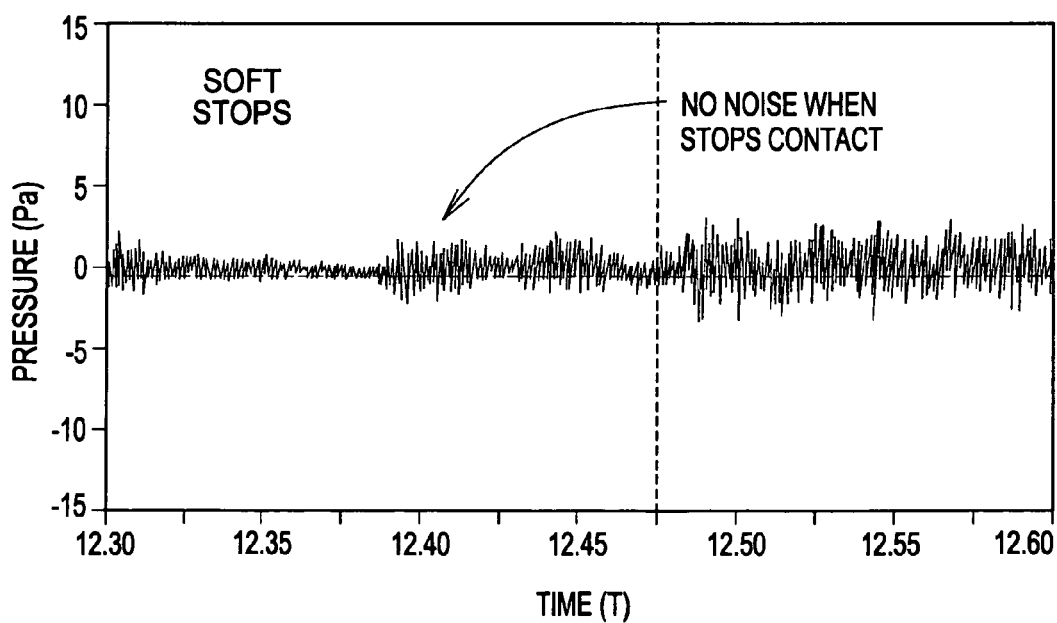
FIG. 6 is a graph of noise produced by rubber covered stops.

FIG. 6 is a graph of noise produced by rubber covered stops. The noise created when the stops engage is significantly reduced by use of the rubber member 80.

Although a form of the invention has been described herein, it will be obvious to those skilled in the art that variations may be made in the construction and relation of parts without departing from the spirit and scope of the invention described herein.

We claim:

1. An isolator comprising:
   a shaft (10);
   a pulley (20) journalled to the shaft on a first bushing (40) and a second bushing (50);
   the shaft comprising a shaft stop (12) disposed on a shaft radially outer surface (14);
   the pulley and the shaft rotationally moveable relative to each other;
   the pulley comprising an inner hub (23), the inner hub having a pulley stop (24) disposed to cooperatively engage the shaft stop;
   a torsion spring (30) engaged with the shaft and the pulley, the torsion spring exerting a contractive force parallel to an axis of rotation (A-A) in order to retain the pulley on the shaft;
   a cover member (60) fixed to the shaft, the pulley urged into engagement with the cover member by the torsion spring axial contractive force; and
   a rubber member (80) disposed on the shaft stop for engaging the pulley stop.

2. The isolator as in claim 1, wherein the pulley comprises a multi-ribbed surface.

3. The isolator as in claim 1 further comprising a tool receiving portion.

4. The isolator as in claim 1, wherein the pulley comprises a flange forming a labyrinth seal with the cover member.

* * * * *